United States Patent [19]
Fey et al.

[11] 3,765,870
[45] Oct. 16, 1973

[54] METHOD OF DIRECT ORE REDUCTION USING A SHORT CAP ARC HEATER

[75] Inventors: Maurice G. Fey, Turtle Creek; George A. Kemeny, Murrysville, both of Pa.

[73] Assignee: Westinghouse Electric Corporation, Pittsburgh, Pa.

[22] Filed: Dec. 15, 1971

[21] Appl. No.: 208,264

[52] U.S. Cl. .................................. 75/10 R, 75/11
[51] Int. Cl. ............................................. C22d 7/04
[58] Field of Search ............... 75/10 R, 10 V, 10 P, 75/11

[56] References Cited
UNITED STATES PATENTS

| | | | |
|---|---|---|---|
| 3,389,189 | 6/1968 | Hirayama et al. | 23/277 R X |
| 3,390,979 | 7/1968 | Greene | 75/11 |

*Primary Examiner*—L. Dewayne Rutledge
*Assistant Examiner*—M. J. Andrews
*Attorney*—A. T. Stratton et al.

[57] ABSTRACT

The oxides of certain metals including iron, chromium, manganese, vanadium and titanium may be finely ground or otherwise pulverized and supplied in a gas flow stream to the heating region of an arc heater. In the heating region an electric arc capable of producing temperatures sufficient to free hydrocarbon radical ions from hydrocarbon gas may be used to assist in separating the metal from the metal oxide ore.

5 Claims, 1 Drawing Figure

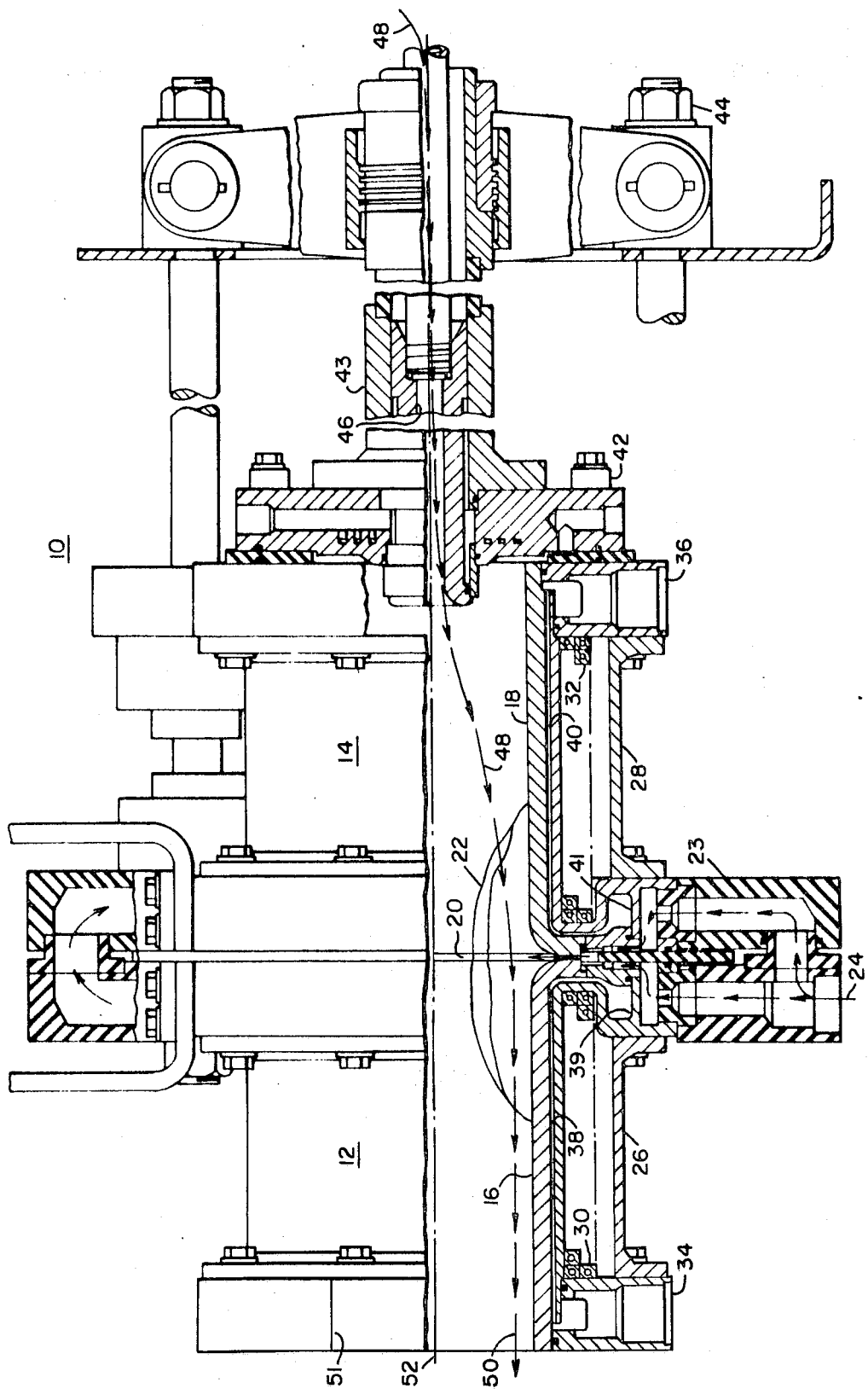

METHOD OF DIRECT ORE REDUCTION USING A SHORT CAP ARC HEATER

BACKGROUND OF THE INVENTION

This invention relates to electric arc heaters in general and in particular to electric arc heaters adapted for reducing metal oxides.

The reduction process for some metal oxides includes the use of a blast furnace in which iron ore is reduced by the reactive effect of hot carbon monoxide produced from coke. Electric furnaces or arc heaters have been developed which use electric arcs to assist in the reduction of metal oxides, usually in combination with a gas such as oxygen, carbon monoxide, hydrogen or certain hydrocarbon gases. An example of such a furnace is shown in U.S. Pat. No. 3,232,746 entitled "Method For Reduction of Metal Oxide" by B. Karlovitz. In this case, a hydrocarbon gas is partially burned and supplied to a reduction furnace between electrodes, whereupon a diffused electric charge is established in the flame to increase its energy sufficiently to heat and reduce the ore to the metallic state. The carbon monoxide and hydrogen may react with various metal oxides such as iron ore to convert the iron ore into iron and gaseous byproducts. In this case, the iron is precipitated off to form a molten pool which may be later tapped for conversion of the iron to steel.

In another example, as disclosed in U.S. Pat. No. 3,390,979 entitled "Direct Steel Making Process" by A.E. Greene, particles of certain metal oxides are supplied to one end of an elongated vertical chamber in which an arc is longitudinally struck. A reduction gas is passed into the chamber in the opposite direction from the other end and allowed to flow upwardly past the arc and the metal particles. As the reaction process takes place the byproduct gases are tapped out of the top of the vertical chamber at a different exhaust port and the metal precipitates out through the bottom of the vertical chamber.

Both of these inventions have disadvantages. One of these is the temperature to which the reducing gas is raised as in the first-mentioned patent and another disadvantage is the dependence upon gravity in a vertical chamber and the generation of a continuous rather large arc in the latter patent. It would be advantageous to provide an arc heater apparatus adapted to expose a hydrocarbon gas to an electric arc rather than a diffused electric discharge pattern so that the gas may be raised to an extremely high temperature sufficient to generate the hydrocarbon radical ion rather than merely the carbon monoxide and hydrogen which can be produced at lower temperatures so that various metal oxides other than iron may also be reduced. In addition, the hydrocarbon ion reacts so speedily when compared with carbon monoxide and hydrogen in reducing metal oxides that the metallic oxide feedstock may be injected into the arc chamber at extremely high speeds, be reacted upon speedily, and the resulting metal may be supplied through an exhaust chamber in the form of a fluid or liquid stream of generally pure metallic particles to another process apparatus which may use the fluid metal as a component element.

SUMMARY OF THE INVENTION

In accordance with the present invention, various arc heater apparatus which may be adapted to be supplied with fluid streams of porous material from at least two regions into the vicinity of a high energy, high temperature electric arc may be applied to reduce metal oxides which flow in one of the streams by generally concurrently reducing a hydrocarbon based gas which may be flowing in another stream to produce the hydrocarbon radical ion which, for the purpose of illustration, may be described as $CH_x$ (in which X may be any number from one to three). One of the characteristics of the disclosed method is that the metal oxide may be pulverized or otherwise finely ground and fed into a high velocity axially oriented stream of gas which flows axially into the arc chamber of an arc heating apparatus. The hydrocarbon gas which may be methane, acetylene or propane may pass substantially perpendicularly through an electric arc which has been struck in a gap in the arc heater chamber and into the stream of the oncoming metal oxide bearing gas. The electric arc is provided to reduce the hydrocarbon gas and to generally simultaneously produce a short-lived hydrocarbon radical ion which immediately reacts with the metal oxide to reduce the metal oxide to a metal which is then forcefully blown out of the exhaust port of the arc heating chamber. This high reaction rate allows for the reduction of more metal oxide per unit time as well as moving corrosive byproducts from the reaction area quickly. Examples of arc heating apparatus which may be quickly adapted to perform the function previously described are shown and described in U.S. Pat. Nos. 3,445,191 by A.M. Bruning et al entitled "Arc Heater Apparatus for Chemical Processing," in U.S. Pat. No. 3,522,015 by D.A. Maniero et al entitled "Direct Conversion Chemical Processing Arc Heater" and in U.S. Pat. No. 3,705,975 by C.B. Wolfe et al entitled "Self-Stabilizing Arc Heater Apparatus" all of which are assigned to the assignee of the present application. Other arc heating apparatus similar to those mentioned may also be adapted to perform the functions previously described.

BRIEF DESCRIPTION OF THE DRAWINGS

For a better understanding of the invention, reference may be had to the preferred embodiment exemplary of the invention shown in the accompanying drawing in which:

The sole FIGURE shows a sectional view in elevation of an arc heater apparatus adapted to perform the methods of the disclosed invention.

DESCRIPTION OF THE PREFERRED EMBODIMENTS

Referring now to the FIGURE, a cross-sectional view of an arc heater as previously described in U.S. Pat. No. 3,705,975 is shown. The arc heater apparatus 10 includes a left electrode chamber 12 and a right electrode chamber 14 having electrodes 16 and 18 respectively which are generally cylindrical, and coaxially disposed on a common axis 52 and spaced by a narrow gap 20. In the preferred embodiment of the invention, an electric arc 22 may be struck in the narrow gap 20 either by a direct current or alternating current backup source of power, whereupon the arc may be blown into the arc chamber by the force of a gas or fluid 24 being injected or provided into the arc chamber through the narrow gap 20. It is not necessary in all embodiments of the invention for the arc to be blown far out into the arc chamber as is shown in the FIGURE. It is merely necessary for the arc to heat the hydrocarbon gas and for the feedstock or metallic oxide bearing gas to come in contact with the arc to some reasonable degree.

Electrode chambers 12 and 14 are supported by generally rigid supporting means 26 and 28 respectively which may by fastened together so that a gas introduction means 23 which may include manifolds for channeling the gas 24 into the arc chamber region may be placed adjacent gap 20. In addition, part of magnetic flux producing means which may be either of the permanent or the electromagnetic variety and which may be used singularly or in cooperation are shown at 30 and 32. These means may be provided to produce a magnetic field within the region of the arc chamber to cause the roots of arc 22 to precess or move under the influence of the magnetic field around the inner surface of the electrodes 16 and 18. In addition, cooling means may be provided to the electrodes 16 and 18 as indicated by chambers or paths 38, 39, 40 and 41 in the FIGURE. Water or a similar cooling medium may be supplied to ports 34 on 36 with one port acting as an input port and the other acting as an exhaust port for the cooling fluid.

Adjacent to one end of the opened arc chamber formed by the electrodes 16 and 18 may be placed a feedstock injection means 43 sufficiently fastened to the open end of the electrode 18 by a fastening means such as 42 shown in the FIGURE. The feedstock injection means may include a hollow, central tubular orifice, having an axis 52, through which a metal oxide bearing gas 48 may be supplied into the arc chamber region. The metal oxide bearing gas may contain finely ground or minute particles of the metal oxide ores of such metals as iron, vanadium, manganese, chromium or titanium, for example. It should be understood that the reduction process is not limited to oxides of these particular metals, but may be used for any metal oxide which may be finely pulverized and carried upon an injection stream such as indicated at 48 and be reduced by the enhanced reduction power of the hydrocarbon radical ion. Adjacent the other end of the arc heating apparatus is an exhaust port 51 through which a stream of metal bearing gas 50 may be conducted. In some instances, the force of the injection at injection means 43 may be sufficient to blow the reduced metal out of the exhaust port 51 in liquid or droplet form or in a fine mist.

In the operation of the apparatus, the hydrocarbon gas 24 is provided to the gap 20 at a relatively cool supply temperature, whereupon it is exposed to the high temperature and energy of the electric arc 22 which may raise the temperature of the gas to extreme values to form the hydrocarbon radical ion $CH_x$ which may be $CH_3$, for example. These hydrocarbon radicals have very short lives and may be produced quite rapidly in great volume from hydrocarbon gas by the presence of the electric arc 22. The metal oxide may be directly exposed to the arc and the hydrocarbon ion whereupon almost instantaneous reduction of the metal oxide may take place, allowing the resultant metal to continue to flow as shown by gas flow arrow 50 quickly out of the exhaust end 51 of the arc heating apparatus 10. This fluid metal may be used in a further process without the necessity for storing, collecting or precipitating it. Hydrogen and carbon product type gases may be introduced simultaneously into the region of the gap rather than pure hydrocarbon gas to achieve the same desired result, namely the formation of the hydrocarbon ion which is so beneficial in quickly capturing the oxygen of the metal oxides and providing relatively pure metal as an output product from the chemical process. In some instances, it may be desirable to use a metal oxide bearing gas which is also a hydrocarbon so that the electric arc may break down the hydrocarbon as it speeds past the electric arc, forming the hydrocarbon ion which quickly reduces the metal oxide in the immediate vicinity of the arc.

It is to be understood that although a horizontal high speed processing apparatus is shown, it may also be vertically oriented. The relative speed of the feedstock metal oxide bearing gas may be varied according to the particular needs of the chemical process. At times, it may be relatively slow and at other times it may approach sonic velocity. It is also to be understood that the hydrocarbon gas such as shown by arrows 24 may be any suitable gas or combinations of gases adapted to generate a hydrocarbon radical ion. It is to be understood that carbon atoms or ions and carbon monoxide molecules may also be formed incidentally as a byproduct of the heating of the hydrocarbon gas by the arc, but that these ions or atoms, although they are beneficial in capturing some of the oxygen from the metallic oxides, are not envisioned to be the main reactant in the reduction process. It is also to be understood that the exit porthole 51 of the arc heater 10 may correspond to an entrance porthole for another process mechanism or apparatus. In some instances, the hydrocarbon gas may be provided through the feedstock channel 46 and the metal oxide may be provided through the gap 20, the results being virtually the same in both cases. It is also to be understood that the gas 24 which is provided to the gap 20 may blow the electric arc out into the arc chamber for a more efficient exposure to the metal oxide bearing gases and may assist in swirling or rotating the arc if desirable to prevent damage to the surfaces of the electrodes 16 and 18.

The apparatus involving the teachings of this invention has many advantages, one of which is the capability of reducing metal oxides which could not otherwise be reduced by conventional chemical reaction processes. As an example, carbon and carbon monoxide ions and atoms are not effective for reducing the oxides of vanadium or chromium whereas the hydrocarbon radical ion is effective for reducing the oxide of these metals and producing the metal in its pure state. Another advantage is the high speed with which the operation may be accomplished due to the relatively high free energy available in the hydrocarbon ion to reduce metal oxides quickly and efficiently even though these ions have a very short life. Another advantage of the present invention is that the short gap arc heater generally creates a stable arc. It is also an advantage of the present application that the reaction takes place quickly and vitually entirely within the region of the electric arc so that no reactive processes are continued as the stream of liquid metal is blown out of the exhaust port and into another reactive process, for example. This means that the output product of the present invention is more likely to be a substantially pure metal rather than partially reduced metal oxide.

What we claim is:

1. A method for reducing oxides of metals in an electric arc heater comprising the steps of:

striking an electric arc in an axial gap between generally hollow, cylindrical electrodes spaced along a common axis which form an arc chamber therein having two ends, said arc being maintained at a temperature for at least a portion of its life sufficient to produce free hydrocarbon radical ions from hydrocarbon gas;

providing generally forcefully, relatively cool hydrocarbon gas to said gap in a direction generally transverse to said axis to thereby elongate said arc to produce a temperature therein sufficiently high to produce said free hydrocarbon radical ions from said hydrocarbon gas while concurrently periodically positioning a portion of said arc in said arc chamber because of the elongation of said arc so that said hydrocarbon gas is thereby available for chemically reacting with material within said arc chamber;

feeding, generally forcefully, from one end of said arc chamber metal oxide in a path generally parallel to said axis through one of said hollow electrodes and to said region in said arc chamber containing said portion of said arc and said free radical ions to thereby chemically react generally simultaneously with said free radical ions to produce a relatively axially oriented fluid stream of metal; and feeding said axially oriented fluid stream of metal through said other hollow electrode to an exhaust part at the other end of said arc chamber.

2. The method as claimed in claim 1, including the additional step of:

moving the roots of said arc generally circumferentially along the inner surfaces of said electrodes by interaction of the electric current of said arc near said surface with magnetic field lines generated by a magnetic field producing means adjacent said electrodes.

3. The method as claimed in claim 2, wherein said metal oxide comprises iron oxide and said hydrocarbon gas comprises methane.

4. The method as claimed in claim 2, wherein said metal oxide comprises iron oxide and said hydrocarbon gas comprises propane.

5. The method as claimed in claim 2, wherein said metal oxide comprises iron oxide and said hydrocarbon gas comprises acetylene.

* * * * *

UNITED STATES PATENT OFFICE
CERTIFICATE OF CORRECTION

Patent No. 3,765,870                    Dated October 16, 1973

Inventor(s) Maurice G. Fey and George A. Kemeny

It is certified that error appears in the above-identified patent and that said Letters Patent are hereby corrected as shown below:

Column 1, lines 1 and 2, cancel "[54] METHOD OF DIRECT ORE REDUCTION USING A SHORT CAP ARC HEATER" and substitute - - [54] METHOD OF DIRECT ORE REDUCTION USING A SHORT GAP ARC HEATER - -.

Signed and sealed this 21st day of May 1974.

(SEAL)
Attest:

EDWARD M. FLETCHER, JR.
Attesting Officer

C. MARSHALL DANN
Commissioner of Patents